United States Patent
Bowen

(10) Patent No.: US 9,124,629 B1
(45) Date of Patent: Sep. 1, 2015

(54) USING SECURE CONNECTIONS TO IDENTIFY SYSTEMS

(71) Applicant: Amazon Technologies, Inc., Reno, NV (US)

(72) Inventor: Peter Zachary Bowen, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 231 days.

(21) Appl. No.: 13/764,688

(22) Filed: Feb. 11, 2013

(51) Int. Cl.
*H04L 29/06* (2006.01)

(52) U.S. Cl.
CPC .................................... *H04L 63/168* (2013.01)

(58) Field of Classification Search
CPC .............. H04L 63/166; H04L 63/0823; H04L 63/0272; H04L 9/3271; H04L 63/061; H04L 67/14; H04L 9/3273; H04L 9/3263; H04L 2209/76; H04L 63/0281; H04L 9/0802; H04L 9/0838; H04L 9/12; H04L 29/06319; H04L 63/1416; H04L 63/1408
USPC ......................................................... 713/151
See application file for complete search history.

(56) References Cited

U.S. PATENT DOCUMENTS

| | | | | |
|---|---|---|---|---|
| 8,145,768 B1 * | 3/2012 | Hawthorne | | 709/228 |
| 2004/0006710 A1 * | 1/2004 | Pollutro et al. | | 713/201 |
| 2008/0034110 A1 | 2/2008 | Suganthi et al. | | |
| 2008/0281941 A1 * | 11/2008 | Park et al. | | 709/217 |
| 2009/0235067 A1 | 9/2009 | Miller et al. | | |
| 2010/0131960 A1 | 5/2010 | Suganthi et al. | | |
| 2010/0153702 A1 * | 6/2010 | Loveless | | 713/151 |
| 2011/0004878 A1 | 1/2011 | Divoux | | |
| 2011/0225641 A1 * | 9/2011 | Wu et al. | | 726/9 |
| 2011/0313925 A1 | 12/2011 | Bailey, Jr. | | |
| 2012/0016977 A1 | 1/2012 | Robertson et al. | | |
| 2014/0165147 A1 * | 6/2014 | Hershberg et al. | | 726/4 |

* cited by examiner

*Primary Examiner* — Ali Abyaneh

(74) *Attorney, Agent, or Firm* — Kilpatrick, Townsend & Stockton, LLP

(57) ABSTRACT

A session identifier is used during negotiation of a secure connection between a client and an endpoint that includes both session information and client identification information. For example, a client connects to a load balancer using transport layer security (TLS). The load balancer may pass client information, such as session information, on to an application server that determines client information to put in a TLS session identifier. The application may send the client information to include in the TLS session identifier back to the load balancer. The load balancer may combine TLS session information for resuming TLS communications and client information for identifying the client into the session identifier. The session identifier may be passed to the client for use in later communication. TLS negotiation between the client and the load balancer may be completed and a secure connection begun. The application may monitor actions performed by the client.

27 Claims, 14 Drawing Sheets

USING SECURE CONNECTIONS TO IDENTIFY SYSTEMS

CROSS-REFERENCES TO RELATED APPLICATIONS

This application is related to and incorporates by reference for all purposes the full disclosure of co-pending U.S. patent application Ser. No. 13/764,679, filed Feb. 11, 2013, entitled "INFORMATION SHARING PROXY".

BACKGROUND

Application servers may provide a service to clients. For example, an application server may provide web-based email to clients. As a number of clients grow, the computing requirements also grow. Instead of a more powerful computer, groups of application servers may be used to service larger groups of clients. However, as the groups become larger, loads among servers may be unequal and secure communications may also be necessary. The complexity of the application servers may also increase with the increased number of application server interactions. This complexity may increase the vulnerability of application servers that are directly reachable on the Internet.

Load balancers may distribute load and reduce load on application servers while reducing exposure of the application servers. For example, a load balancer may distribute work evenly among multiple application servers and terminate secure communication protocols on behalf of application servers. In some data centers, load balancers may be impleted by virtual computing systems hosted by a computing resource provider. One side effect of this load balancing is that the load balancer relays information between the client and the application server, such that the application server and client may not directly communicate.

BRIEF DESCRIPTION OF THE DRAWINGS

Various embodiments in accordance with the present disclosure will be described with reference to the drawings, in which.

DETAILED DESCRIPTION

Figure 1:
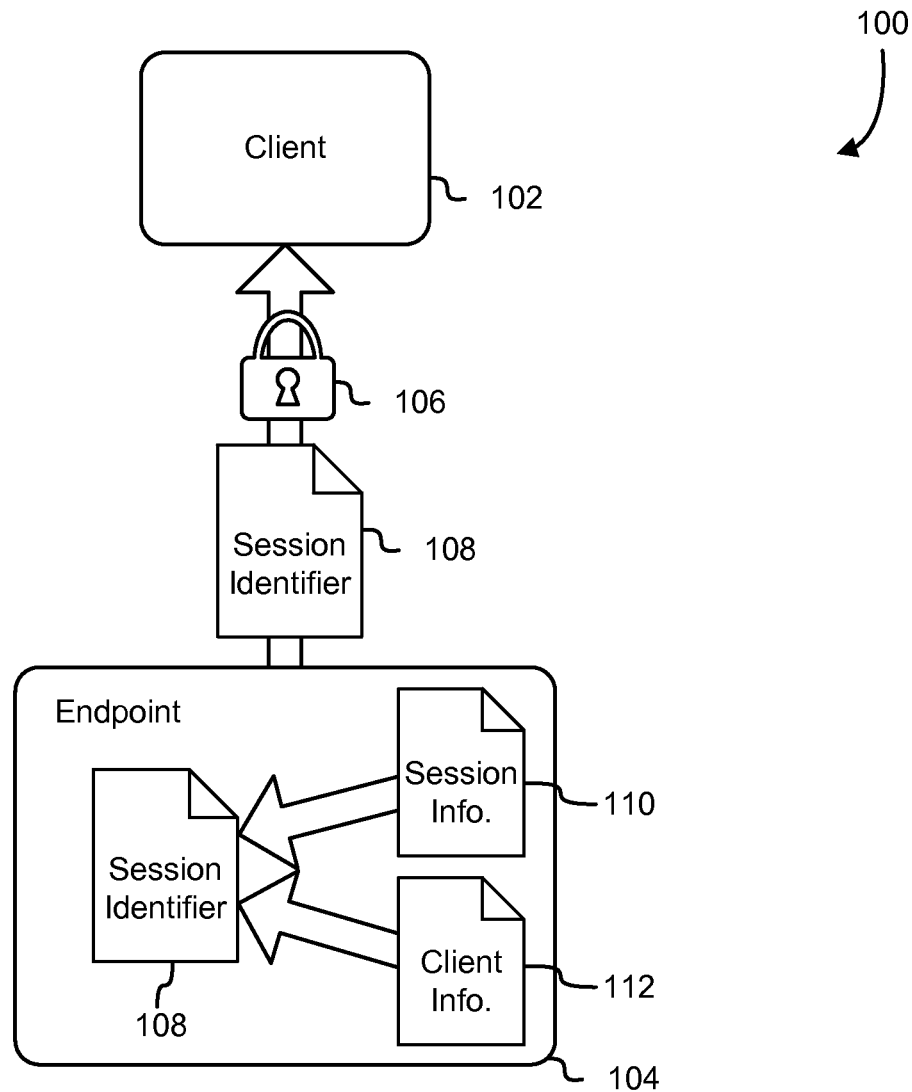
FIG. 1 shows an illustrative example of a client identification system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include creating a session identifier to use during negotiation of a secure connection that includes both session information and client identification information. In one embodiment, a load balancer may give a session identifier during a first secure connection negotiation that also allows the client to resume communications during a second secure connection negotiation. The session identifier may be crafted such that the client may also be identified as the client from the first secure connection negotiation by the given session identifier. For example, a client connects to a load balancer using transport layer security (TLS). The load balancer may determine during negotiation that the client supports TLS session tickets. The load balancer may pass the client information, such as session information, on to an application server that determines client information to put in the TLS session ticket. The application may send the client information to include in the TLS session ticket back to the load balancer. The load balancer may then combine TLS session information used to resume TLS communications and client information that may be used to identify the client into the session identifier. The session identifier may then be passed to the client for use in a later communication. Then, the TLS negotiation between the client and the load balancer may then be completed and a secure connection completed. The application may monitor actions performed by the client.

At a later point, the client may request a second connection with the load balancer and offer the TLS session ticket to resume communications and avoid recomputing cryptographic setup operations. The load balancer may split the TLS session ticket into session information and client information. The session information may be used by the load balancer to resume communications with the client, while the client information may be sent to the application. The application may then correlate actions performed during the second connection with actions performed during the first connection.

An advantage of correlating the first connection and second connection is that activity such as sock puppeting may be identified. Sock puppeting, or the act of using multiple accounts to gain a larger voice and/or circumvent content submission restrictions, may corrupt useful feedback as one person may be given multiple voices to drown out other legitimate voices. For example, a client, such as a web browser, may connect to a review service over a first network at home and use a first account over TLS. The client may then connect through a second network at the airport using a second account over TLS. The client may then connect through a third account at a coffee shop using TLS. Because the client used TLS, session information, such as a TLS session ticket, may have been stored during the first connection and used to resume TLS connections during the second and third connections. By adding client identification to the session identifiers and correlating actions, the connections may be correlated and the sock puppeting may be discovered.

It should be recognized that a server may have different forms. In some embodiments, a server may be a virtual server or server based hardware. For example, a virtual server may be an application server running in a virtual environment with a virtual machine. In another example, a server may be code directly manipulating hardware.

Turning now to FIG. 1, an illustrative example of a client identification system 100 in accordance with at least one embodiment is shown. A client 102 requests a secure connection 106 with an endpoint 104. In one embodiment the endpoint is a load balancer. In another embodiment, the endpoint is a TLS layer on an application server. The endpoint 104 may determine client identifying information to include in a session identifier 108. Client identifying information may include account references, visitor references or other references to identify one client from another. In some embodiments, a session identifier 108 may be used in conjunction with one or more other identifiers, such as a browser user agent string, to identify a client 102. A session identifier 108 may be information usable by the endpoint 104 to avoid recomputing cryptographic setup operations. Session identifiers 108 may include TLS session IDs and TLS session tickets. A TLS session ID may be a group of bytes, such as 32 bytes, and a TLS session ticket may be a larger block of information defined by a TLS session ticket creator. The endpoint 104 may combine session information 110 and client information 112 into a session identifier 108. The client 102 may store the session identifier 108 to use in a second secure connection 106 request to avoid cryptographic setup operations, which may be computationally expensive for the endpoint 104. The endpoint 104 and client 102 may finish the secure connection negotiation and open a secure connection 106. The client may then communicate with an application.

The client 102 may return and request a second secure connection. During the negotiation of the secure connection, the client 102 may send the session identifier 108 to the endpoint 104. The endpoint 104 may parse the session identifier 108 to determine a session information portion 110 and a client information portion 112. The endpoint 104 may use the session information portion 110 to determine parameters to construct the second secure connection with the client 102. The endpoint 104 may then use the client information to identify the client 102 as the same client 102 from previous communication sessions, such as the first secure connection 106.

Figure 2:
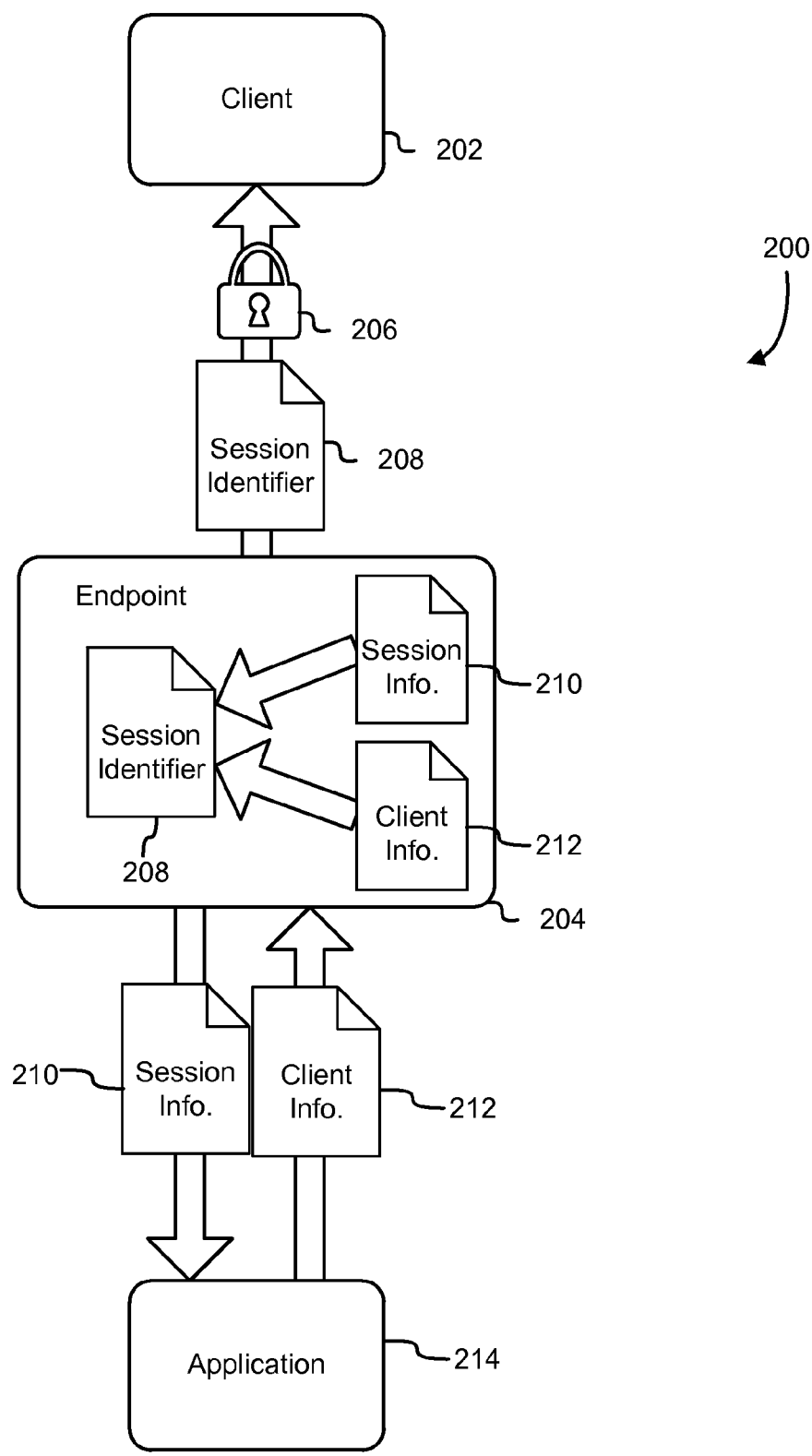
FIG. 2 shows an illustrative example of a client identification system in accordance with at least one embodiment.
Figure 3:
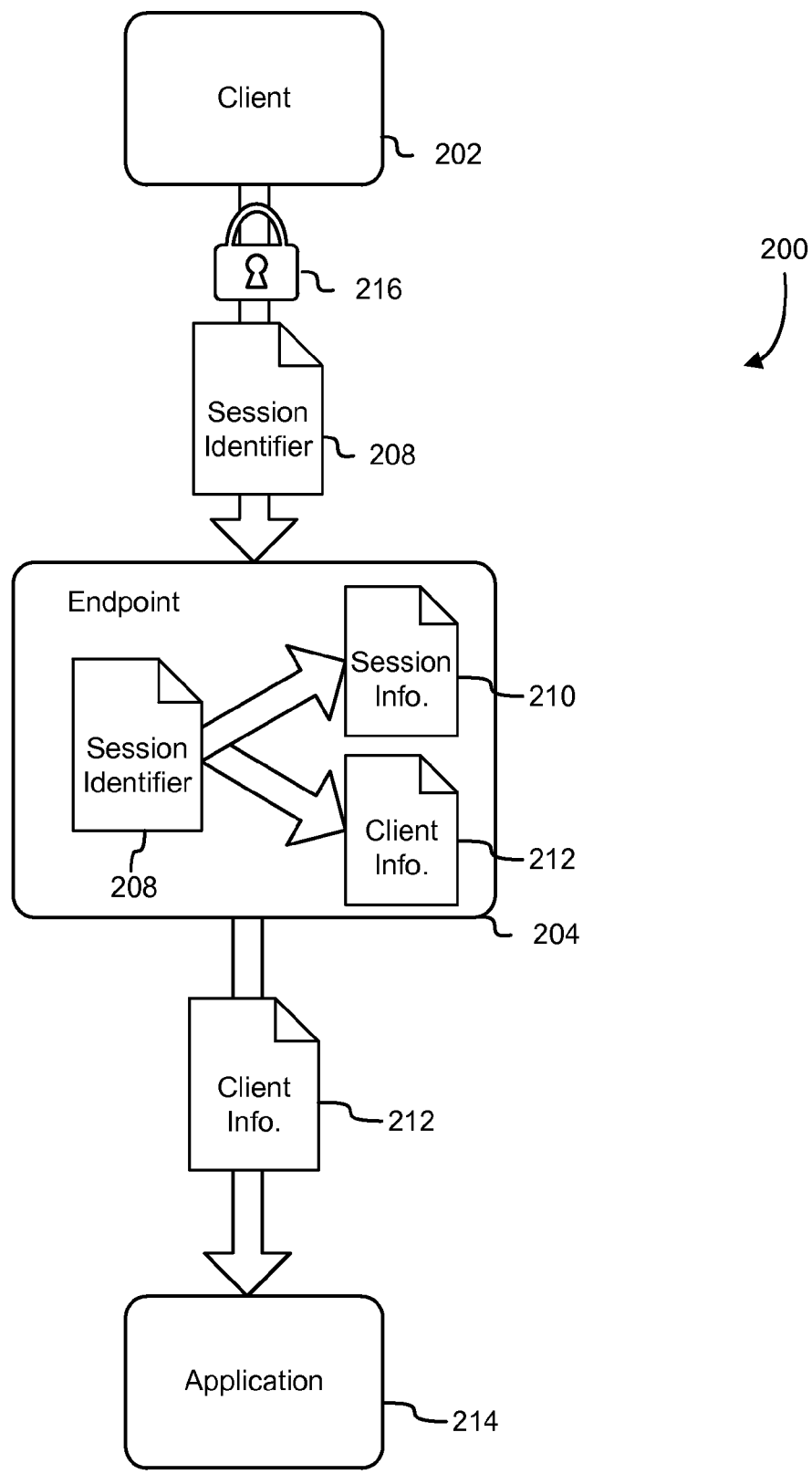
FIG. 3 shows an illustrative example of a client identification system in accordance with at least one embodiment.

Turning now to FIGS. 2 and 3, a client identification system is shown in a first communication session when a session identifier is created (FIG. 2) and during a second communication session in which the session identifier is returned. A session identifier may be crafted such that it identifies characteristics of the first communication session and also the first client. For example, a TLS client ID or session ticket may be crafted with a client identifying portion. As secure connections, such as those negotiated by TLS, are performed by a library, the session identifier is often stored by the library. Attempts to clear an application cache, such as a browser, may not clear the library cache because the library may save the session identifiers to avoid recomputing cryptographic setup operations. This lack of clearing of the cache may allow a session identifier to persist beyond cache clearing events. As a session identifier may be reused between sessions, activities performed by the client may be correlated to a session identifier that includes a client identification portion.

By using the session identifier to correlate actions of a client, several advantages may be obtained. Using a session identifier that includes a client identification portion, actions that normally are performed by different people may be correlated to a single client. For example, sock puppeting, or the act of using multiple accounts to gain a larger voice may be correlated to a single account. Sock puppeting may corrupt useful feedback, such as product reviews as one person may be given multiple voices to drown out other legitimate voices. In another example, click fraud may be detected. An account performing advertising administration, such as adding advertising to a webpage, that also is used to click on advertisements at a later time may be detected by using the session identifier to identify a client.

Turning now to FIG. 2, an illustrative example of a client identification system 200 in accordance with at least one embodiment is shown. A client 202 may request a secure TLS 206 connection with a TLS endpoint 204 supporting an application 214. The TLS endpoint 204 may send session information 210 to the application 214, such as communication parameters that are discovered during the TLS connection request. The application may use this session information 210 to give client information to include as part of the session identifier 208. The session information 210 and client information 212 may be combined to form a session identifier 208. The session identifier 208 may then be sent to the client 202 for use in resuming a TLS session during a second request for a secure connection. After being given the session identifier, the secure connection may be finalized and communication may occur over TLS.

In one embodiment, the session information 210 indicates the session identifier is a TLS session ID. A TLS session ID is a set of bytes. In secure sockets layer version 2 (SSLv2) the session ID is 16 bytes. In secure sockets layer version 3/transport layer security version 1 (SSLv3/TLSv1), the session ID is 1 to 32 bytes. In an embodiment, not all of the bytes of the session ID are needed for session information. A set of bytes may be reserved for client information. For example, a load balancer may use 15 bytes for TLS session information. The remaining bytes may be used for client identification. In SSLv3/TLSv1, the remaining 17 bytes may be used for a client identifier. In some embodiments, this client identifier may be given by the application to the endpoint such that a client may have a consistent identifier across sessions. In another embodiment, all of the bytes may be used for session information. However, the application may influence connection decisions of the load balancer such that unique clients may be identified. For example, the TLS endpoint 204 may send session information 210 to the application 214. The application 214 may then send back a value to include as a random number in the session identifier.

In one embodiment, the session information 210 indicates the session identifier is a TLS session ticket. A TLS session ticket may store more information than a TLS session ID. A TLS session ticket may be used to store session information for a stateless TLS resume. As the TLS protocol does not state what is in the TLS session ticket, client identification information may be added to the TLS session ticket. In one embodiment, a client identifier may be a value that is used to identify one or more accounts. In another embodiment, a client identifier may be a set of identifiers that correlates with one or more visitors.

After the first communication session has completed, the client may request a second communication session with the endpoint, such as TLS endpoint 204, that services the application 214 as seen in FIG. 3. During the negotiation phase of the second secure connection 216, the client may request to resume a TLS connection and include the session identifier 208 that was given during the first connection described in FIG. 2. The TLS endpoint 204 may then separate the client information 212 from the session information 210 and send the client information 212 to the application 214. The TLS endpoint may then finish the secure connection negotiation and open the secure connection. The application 214 may use the client information to correlate current client actions with prior client actions. As a session identifier may survive changes that other identifiers may not, such as a location change or cache clearing, the session identifier may provide a way to determine returning clients.

Figure 4:
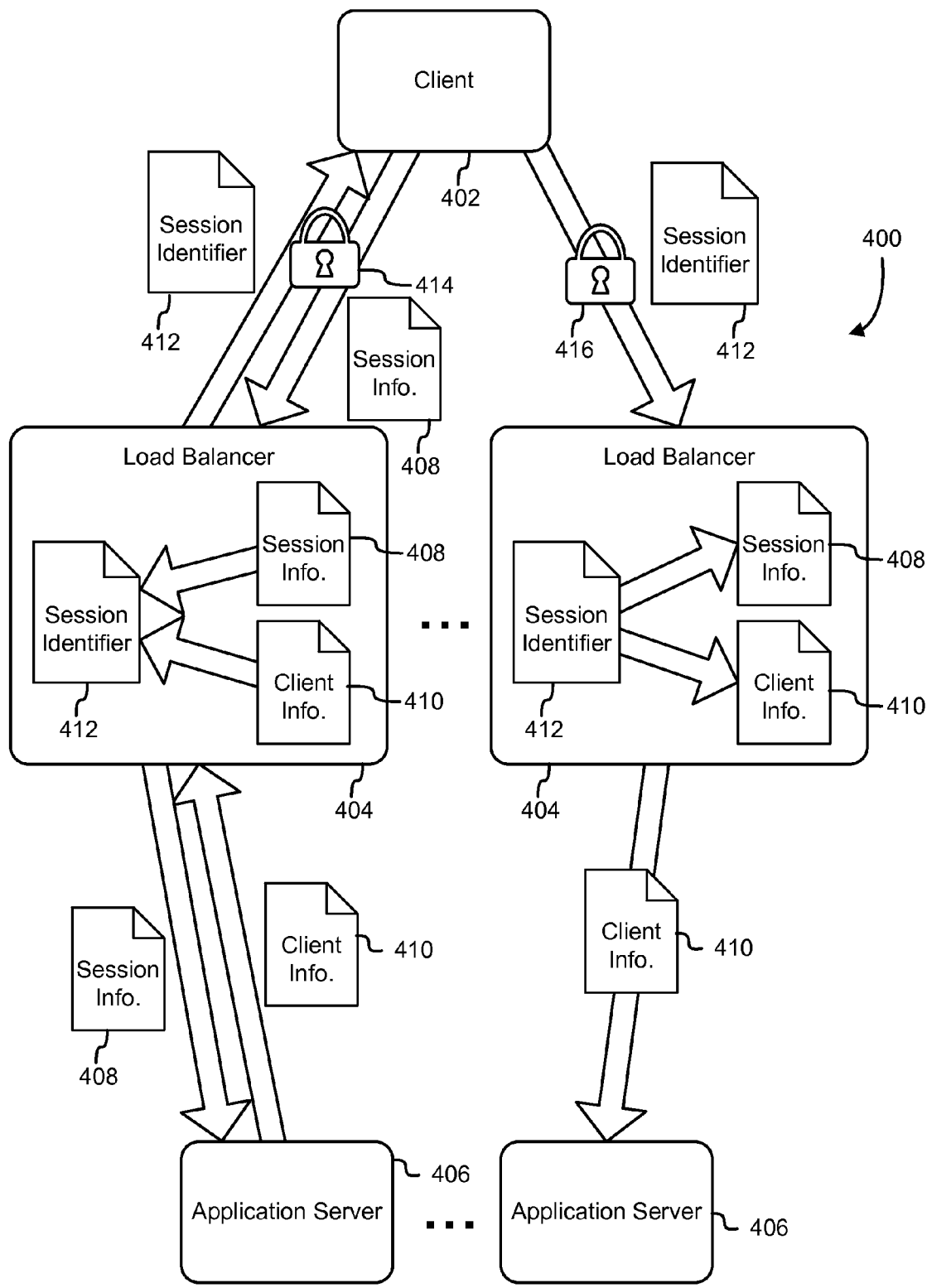
FIG. 4 shows an illustrative example of another embodiment of a client identification system in accordance with at least one embodiment.

Another advantage of using a session identifier to identify clients is that a client may be recognized across a distributed computing system 400, such as one seen in FIG. 4. For example, a client 402 that uses the TLS protocol may request a first secure connection 414 with a first load balancer 404 among a set of load balancers (represented by the ellipsis in between the load balancers 404). As part of the negotiation, the client may send session information 408 that describes capabilities and/or attributes of the client 402. The load balancer 404 may then forward the session information 408 to an application server 406 among a set of application servers. The application server 406 may return client information 410 to use to identify the client 402. The session information 408 and client information 410 may be combined into a session identifier 412 that is sent to the client 402. The session identifier 412 may have the primary purpose of enabling the client 402 to resume a secure session without repeating all of the cryptographic setup operations, but may also include a secondary purpose of identifying the client 402. The load balancer 404 may then finish the negotiation of the secure connection 414 and enable communication between the client 402 and the application server 406.

At some point after the first secure connection 414, the client may request a second secure connection 416 with a second load balancer 404. The client 402 may also send the session identifier 412 received during the negotiation of the first secure connection 414. The second load balancer 404 may separate the session identifier 412 into session information 408 and client information 410. The load balancer 404 may use the session information 408 to finish negotiation of the second connection 416. The load balancer 404 may also send the client information 410 to a second application server 406. The second application server 406 may use the client information to associate the prior actions, such as those occurring over the first secure connection 414, with current actions, such as those occurring over the second secure connection 416. As a session identifier 412 is not tied to an account, but to a host, any accounts connecting through the same client 402 may be associated by use of the client information 410 in the session identifier 412.

By using the session identifier to correlate actions of a client, several advantages may be obtained. Using a session identifier that includes a client identification portion, actions that normally are performed by different people may be correlated to a single client. For example, sock puppeting, or the act of using multiple accounts to gain a larger voice may be correlated to a single account. Sock puppeting may corrupt useful feedback, such as product reviews as one person may be given multiple voices to drown out other legitimate voices. During sock puppeting, a user may submit content under a first account, such as a favorable review, and then later log in under a different account and submit further content, such as a second favorable review. In another example, click fraud may be detected. An account performing advertising administration and/or management, such as adding advertising to a webpage, that also is used to click on advertisements at a later time may be detected by using the session identifier to identify a client.

Figure 5:
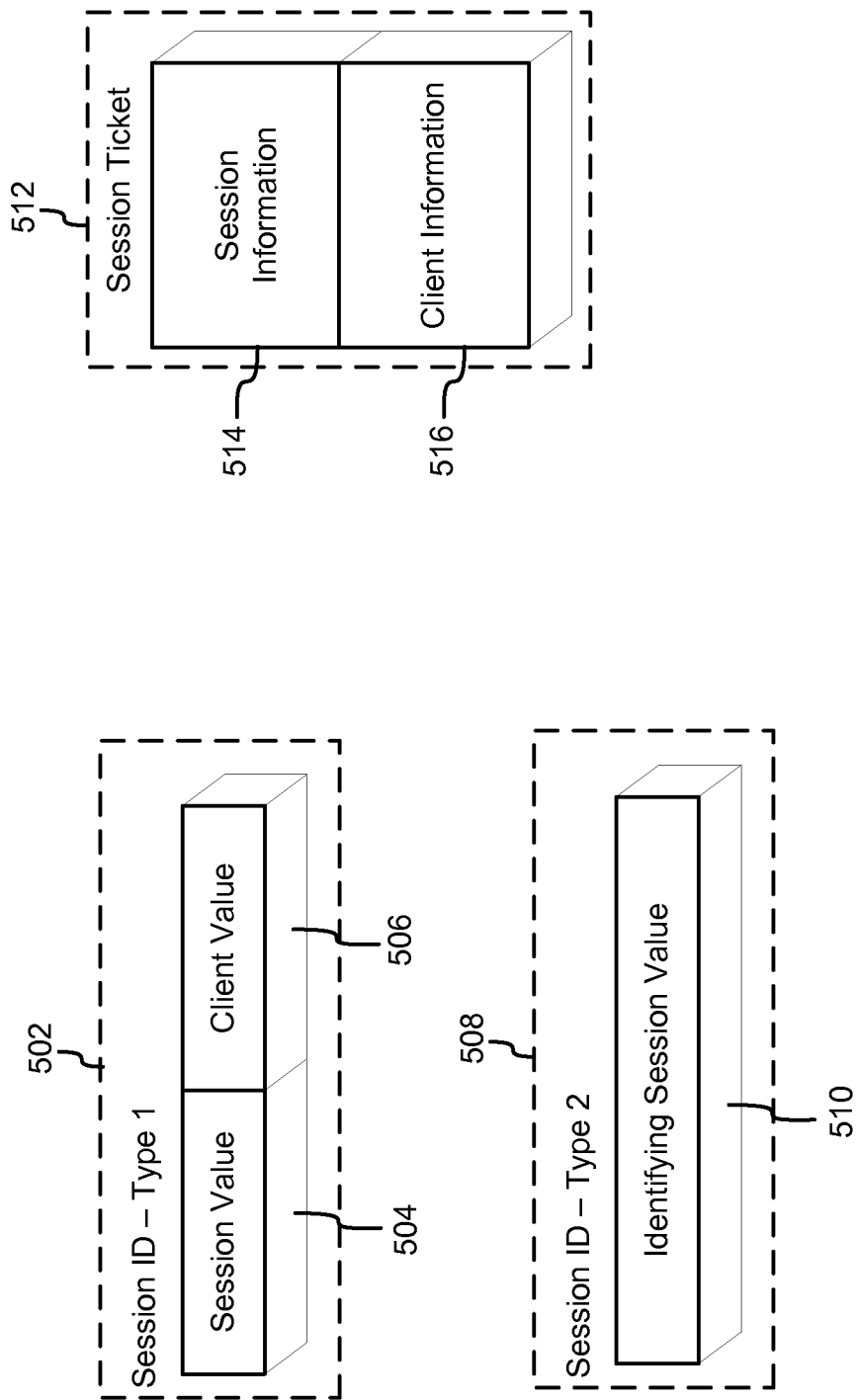
FIG. 5 shows an illustrative example of session identifiers in accordance with at least one embodiment.

Turning now to FIG. 5, an illustrative example of session identifiers in accordance with at least one embodiment are shown. In a first type of session identifier, a set of bytes may be used to represent a session and a client. For example, in a first TLS session ID 502, a session ID may have up to 32 bytes. A portion of the bytes may be allocated to a session value 504 and a portion to the client value 506. In a second type of session identifier, a set of bytes may also be used to represent a session and a client. However, the full set of bytes may be needed to represent the session parameters. For example, in a second TLS session ID 508, all of the bytes may be allocated to a session value 510. However, the session value may be crafted such that individual clients may be identified by the session value 510. This may be through a pseudo random number or modifying communication parameters such that a specific combination of parameters is unique alone or in combination with other client information. In another embodiment, a session identifier may include enough space to store client information alongside the session information. For example, a TLS session ticket 512 may be used. A session ticket 512 may have more space available than a TLS session ID, as a session ticket may be intended to be used in place of caching protocol information. As TLS does not define what is in the session ticket, but does allow that it may be passed as a blob of information, extra information, such as client information, may be added. In the embodiment shown, the session ticket 512 includes a session information portion 514 followed by a client information portion 516.

Figure 6:
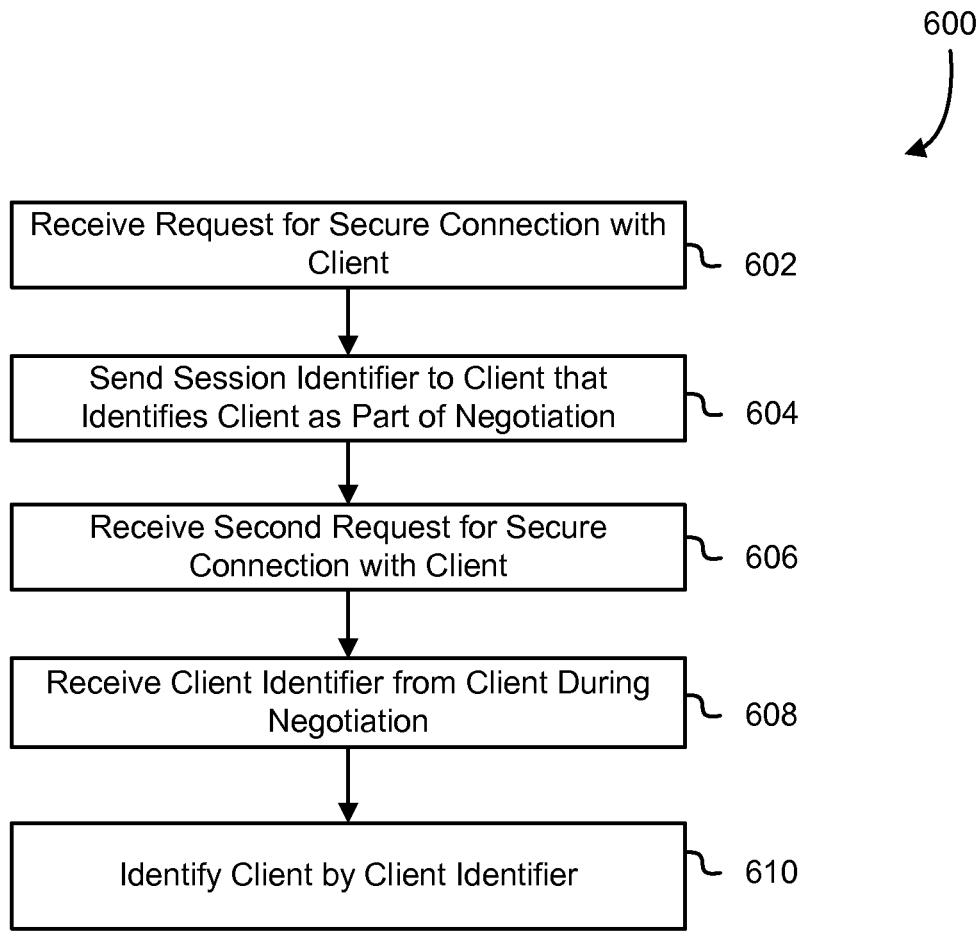
FIG. 6 shows an illustrative example of a process that may be used to identify clients in accordance with at least one embodiment.

Turning now to FIG. 6, an illustrative example of a process that may be used to identify clients in accordance with at least one embodiment is shown. The process may be accomplished by a system, such as the one shown in FIG. 4 that includes a client 402, load balancer 404 and application server 406. A client 602 may request a secure connection with an endpoint that services an application server. The secure endpoint may respond to the request by sending 604 a session identifier to the client during negotiation of the secure connection. The session identifier may identify the client to the application server. The endpoint and client may then finish negotiation and complete the first request. The endpoint may then receive 606 a second request for a secure connection with the same client. As part of the negotiation of the second secure connection, the client identifier may be sent by the client 608 to the endpoint to avoid reperforming cryptographic setup operations. The endpoint may then identify 610 the client is the same client from before by the client identifier. In some embodiments, an application and the endpoint may be running on the same computing resource. In other embodiments, an application that identifies the client may be separate from the endpoint that negotiates the secure connection.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
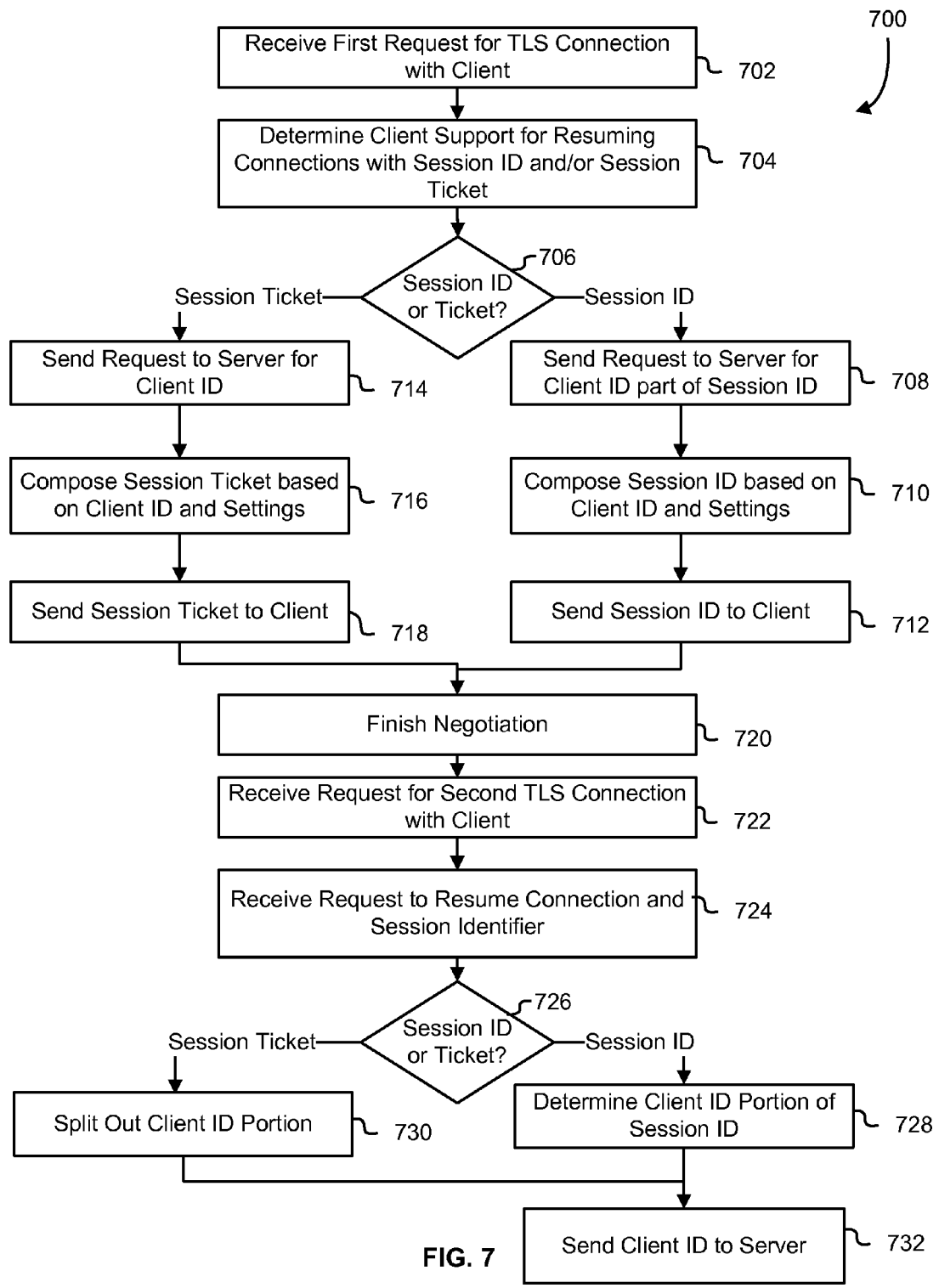
FIG. 7 shows an illustrative example of a process that may be used to identify clients in accordance with at least one embodiment.

Turning now to FIG. 7, an illustrative example of a process that may be used to identify clients in accordance with at least one embodiment is shown. The process may be accomplished by a system, such as the one shown in FIG. 4 that includes a client 402, load balancer 404 and application server 406. A client may request 702 a first secure connection using the TLS protocol with a load balancer servicing one or more servers. The load balancer may determine 704 whether the client supports resumed connections with TLS session ID and/or TLS session ticket. If session tickets are available 706, the load balancer may send 714 a request to the server for client identification information. The request may include information about the client, such as session information. The server may respond and send information that the load balancer may use to compose 716 a session ticket based at least in part on client identifying information and session settings. The session ticket may then be sent to the client 718 and the negotiation of the first secure connection may be followed 720 to a finish. On the other hand, if a session ID is available 706, the load balancer may request 708 a server send client identification information to include as part of the TLS session ID. After receiving the client identification information, the load balancer may compose 710 the TLS session ID based at least in part on the client identification information and settings of the TLS session. The TLS session ID may then be sent 712 to the client as part of the negotiation. The negotiation of the first connection may then be finished 720.

After the first secure connection has completed, a client may request 722 a second TLS connection. The client may use 724 the session identifier previously received in a request to resume TLS communications. If the client identifier is 726 a TLS session ticket, the client identification portion may be split out 730 and sent 732 to a server to identify the client. If the client identifier is 726 a TLS session ID, the client identifier portion of the session ID may be determined 728 and sent to the server 732 to identify the client. The second connection may then be finished and the load balancer may then relay communications between the client and the server over the second TLS connection.

Figure 8:
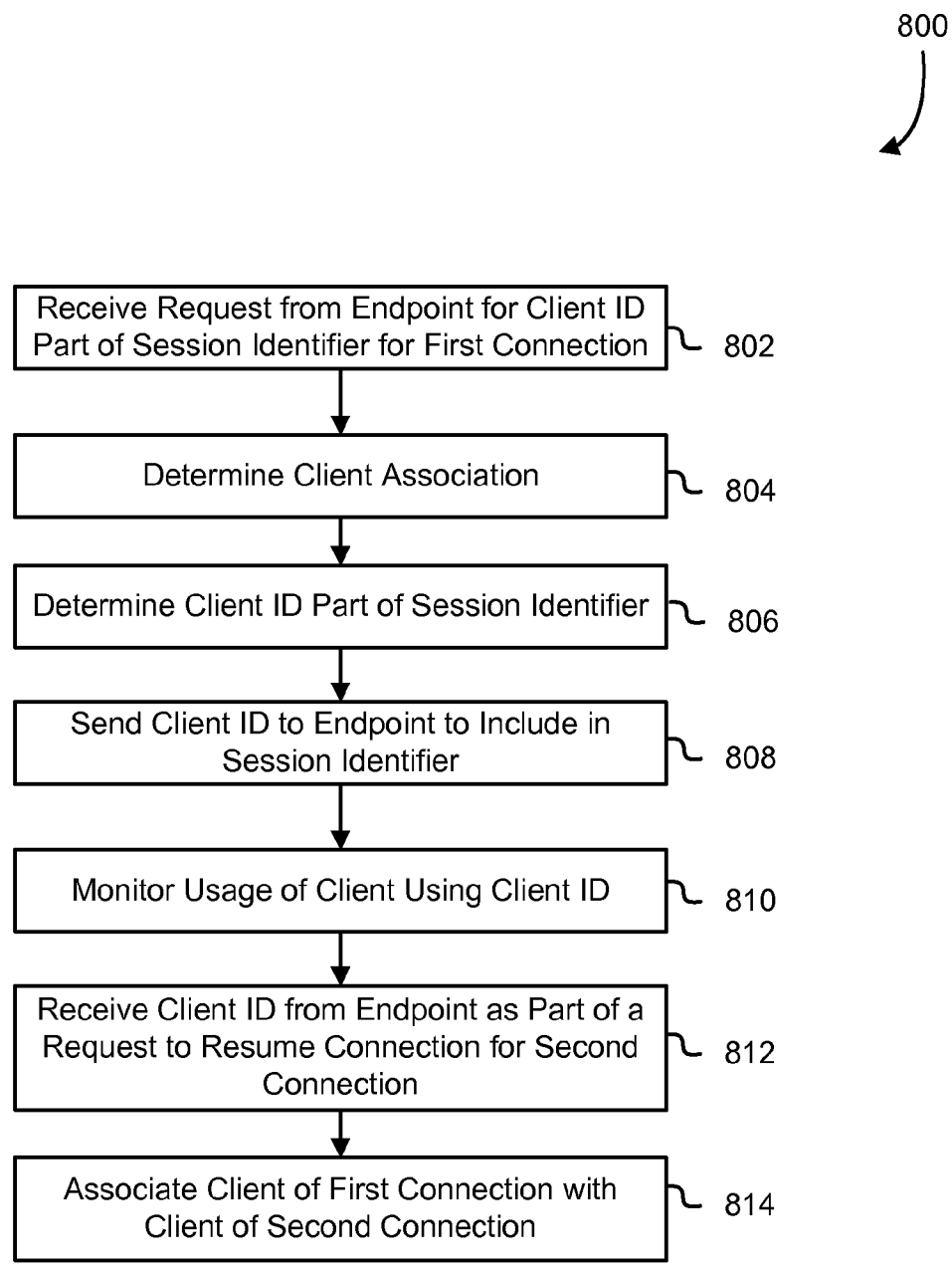
FIG. 8 shows an illustrative example of a process that may be used to identify clients in accordance with at least one embodiment.

Turning now to FIG. 8, an illustrative example of a process that may be used to identify clients in accordance with at least one embodiment is shown. The process may be accomplished by a system, such as the one shown in FIG. 4 that includes a client 402, load balancer 404 and application server 406. An application may receive 802 a request from an endpoint for a client identifier given session information. The application may determine 804 an association of the session information to a client. In some embodiments, this association may be an account. In other embodiments, this association may be a visitor. In an embodiment, this association may be a combination of accounts and/or visitors. Using the session information, such as whether session tickets and/or session IDs are supported, a client identifier may be determined 806 and sent 808 to the client endpoint to include in the session identifier. Usage of the client may then be monitored 810. The client may make a request to resume a second TLS connection in which the client identifier is separated from the session identifier by the endpoint and received 812 by the application from the endpoint. Actions of the client may then be associated 814 with both actions during the first connection and the second connection.

Turning now to FIGS. 9 to 13, an information sharing endpoint is discussed. The information sharing endpoint may use information gathered during a connection to a client to pass through a secure protocol during a negotiation phase. As the information is passed during the negotiation phase of the secure protocol, an application need not be rewritten to understand information passed during the negotiation phase of the secure protocol. In some embodiments, an extensible secure protocol is used. An extensible secure protocol, such as TLS, allows an endpoint to ignore extension information without breaking the original protocol. For example, an application server may safely ignore an offer for client information during TLS negotiation and still complete a secure connection. By passing client information during negotiation, the endpoint may also allow an application to make a decision on the client information obtained while negotiating TLS with the client. Previously, a load balancer may have had to make decisions based on TLS information.

Figure 9:
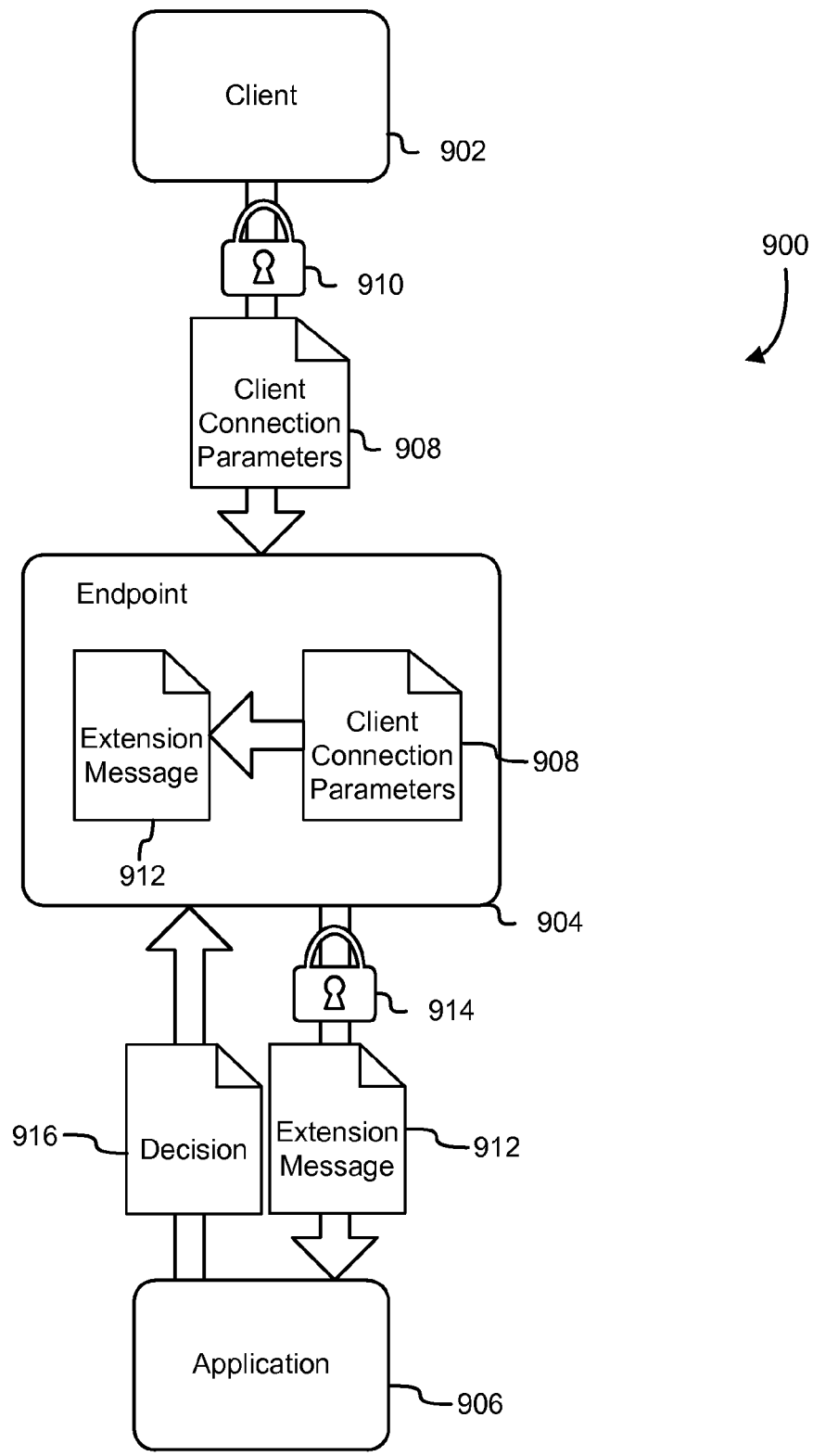
FIG. 9 shows an illustrative example of an information sharing endpoint in accordance with at least one embodiment.

Turning now to FIG. 9, an illustrative example of an information sharing endpoint in accordance with at least one embodiment is shown. A client 902 may make a secure connection 910 with an endpoint 904 servicing an application 906. During the negotiation of the secure connection 910, a client may disclose client connection parameters 908, including IP address, hostname, URL, cryptographic suite, TLS version, TLS session information and/or client certificate, among others. The endpoint 904 may compose an extension message 912 based on the client connection parameters 908 using an extension to a secure protocol, such as TLS. The endpoint 904 may then negotiate a secure connection 914 with an application 906 using the secure protocol. During the negotiation, the extension message 912 may be sent to the application 906. The application 906 may cause a decision 916 to be implemented based on the information in the extension message 912. For example, the application may make a decision 916 on whether to allow the endpoint 904 to accept the client 902 connection. Depending on the embodiment, the endpoint 904 may complete the negotiation of the client secure connection 910 before, after or during the communication of the extension message to the application 906.

For example, a web browser client may send a request to connect with a web application using TLS that is serviced by a load balancer acting as an endpoint 904 for TLS. The web browser may disclose connection parameters 908, including IP address, hostname, URL, cryptographic suite, TLS version, TLS session information and/or client certificate, among others to facilitate the TLS connection. The load balancer may finish negotiating the TLS connection with the client normally. The load balancer may also request a TLS connection with the web application. In some embodiments, the load balancer may request to resume a TLS connection with the web application. As part of the TLS request, the load balancer may provide the client connection parameters 908 as an extension message 912 to the TLS negotiation. The load balancer may then complete the negotiation with the web application and open the secure connection 914. The web application may receive a request to open a pay by credit card page from the client. Using the client connection parameters 908 from the extension message 912, the web application may discover that the client is using a 40 bit key and make a decision 916 to deny the page request because of the low security of a 40 bit key.

In some embodiments, the endpoint 904 may be viewed as having a client-side terminator and a back-end side terminator. The client-side terminator may construct secure connections with the client 902 and collect details about the client 902 and/or the secure connection 910 with the client 902. The client side terminator of the endpoint 904 may pass this client information to the back-end side terminator. In response, the back-end side terminator may request a secure connection 914 with the application 906. During the negotiation of the secure connection 914, the back-end side terminator may send the client information to the application 906 using an extension to a protocol used by the secure connection 914, such as an extension message with a ClientHello message in a TLS protocol.

In some embodiments, an N-tier structure may be formed by repeating the communication of client information between tiers. For example, a four tier structure may include a client communicating with a firewall over a first connection, the firewall communicating over a second secure connection to a security device, the security device communicating with a load balancer over a third secure connection, the load balancer further communicating with a back-end server over a fourth secure connection. Each secure connection may be used to communicate client information as described above. The client information may be relayed from firewall to security device to load balancer to back-end server which may receive the client information and/or make decisions based at least in part on the client information.

Figure 10:
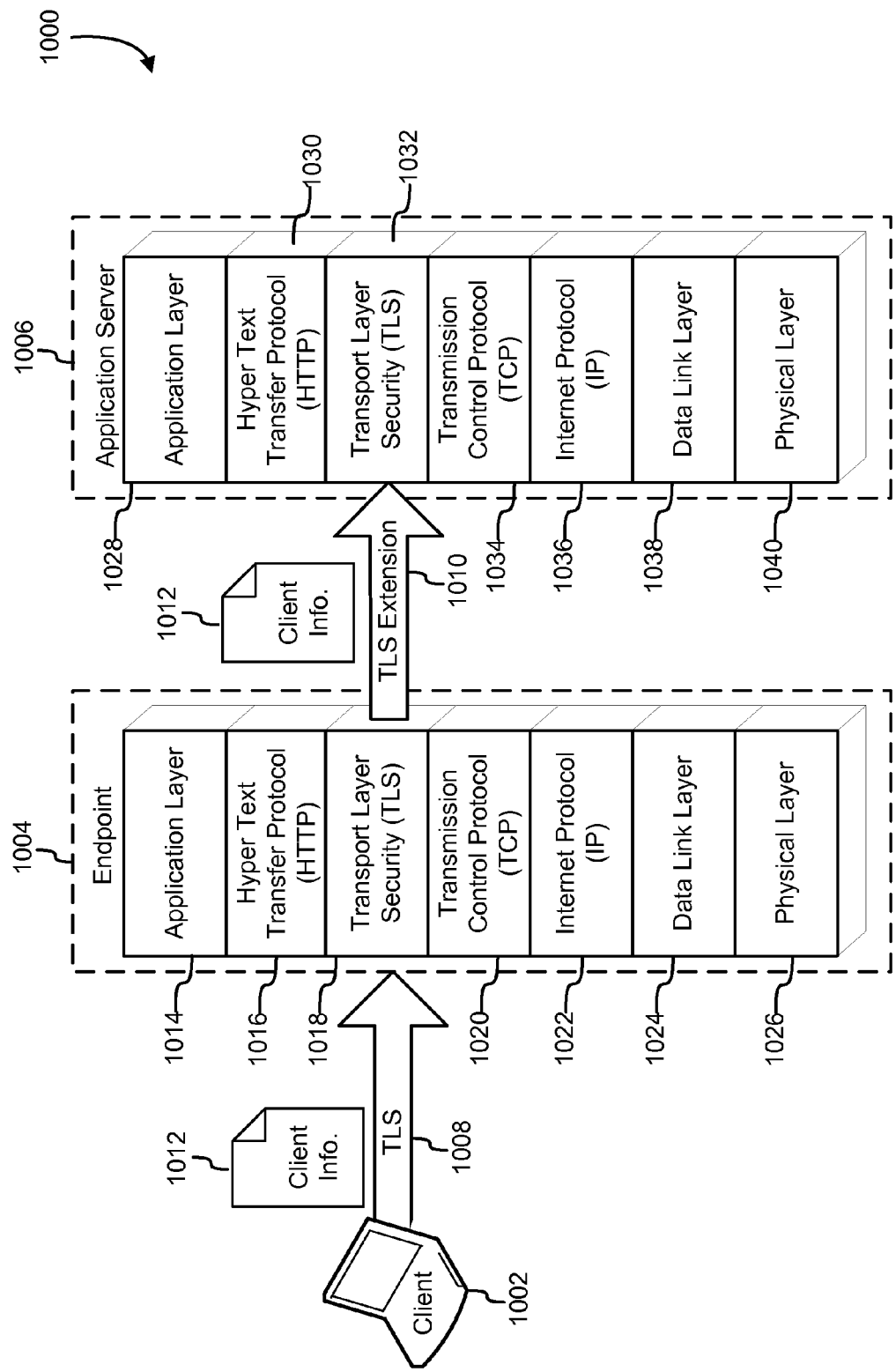
FIG. 10 shows an illustrative example of communication in network stacks using an information sharing endpoint in accordance with at least one embodiment.

Turning now to FIG. 10, an illustrative example of communication in network stacks using an information sharing endpoint in accordance with at least one embodiment is shown. Similar to FIG. 11, a client 1002 communicates with an endpoint 1004 that services an application server 1006. The network stacks of the endpoint 1004 and application server 1006 are shown to emphasize the layer at which information is passed using an extension to the TLS protocol. In the embodiment shown, a client 1002 connects to an endpoint 1004, such as a load balancer, using transport layer security connection 1008. Rich client information 1012 about this TLS connection is available to the endpoint because the endpoint uses this information to negotiate a TLS connection 1008 and communicate with the client 1002. However, this client information 1012 stops with the endpoint 1004 because the endpoint 1004 connects with the application server 1006. As there is no direct link from the client 1002 to the application server 1006, the application server 1006 does not have direct access to the client information 1012. This lack of client information may be remedied by sending the client information 1012 from the endpoint 1004 to the application server 1006. In one embodiment, by using a TLS extension, 1010, the client information 1012 may be sent during a TLS negotiation that is processed by a TLS library. If the application server TLS support does not recognize the extension, an offer to send client information 1012 may be safely ignored. The endpoint 1004 may include a TLS terminator that services a connection with the client 1002 and a TLS initiator that constructs a connection with the Application Server 1006. An example of a TLS terminator may include a TLS server daemon. An example of a TLS initiator may include a TLS client library.

A network stack may be used to simplify the passing of information from application to application over a network link. Each element of the stack may pass information up or down through the stack while providing the service for which it is intended. Messages may originate with an application layer 1014 and 1028. The message may then be passed through HTTP 1016 and 1030 which is a request-response protocol where a resource is identified by a URL. After passing through HTTP, the message passes through a TLS layer 1018 and 1032 in which a secure connection is negotiated with a server identified using HTTP. During this negotiation, the client information 1012 may be passed along using a TLS extension. The TLS layer may then pass encrypted data and destination information to a TCP layer 1020 and 1034 which manages packets to provide reliable ordered delivery of a stream of packets. The TCP layer may pass the data to the IP layer 1022 and 1036 which composes and routes network packets from the data. The link layer 1024 and 1038 then translates the packets to use protocols, such as Ethernet, over the physical layer 1026 and 1040, such as a wire between a computing resource and a switch. The data may be received by a destination's network stack and moved back up the network stack, removing the layer protocol information until an application layer 1014 or 1028 receives the data.

An advantage of using TLS is that TLS is not often controlled by an application, as it is meant to be transparent. With HTTP, HTTP may be manipulated and directly accessed by applications. A change in HTTP protocol may require editing of an application to anticipate possibilities of different protocol states with and without client information. With TLS, extensions may be safely ignored. Thus an offer to send client information 1012 may be ignored by an application using a version of TLS that does not support a client information distribution extension. Another advantage of TLS is that TLS extensions may allow the client information size to be larger than if performed in layers below the TLS layer.

Figure 11:
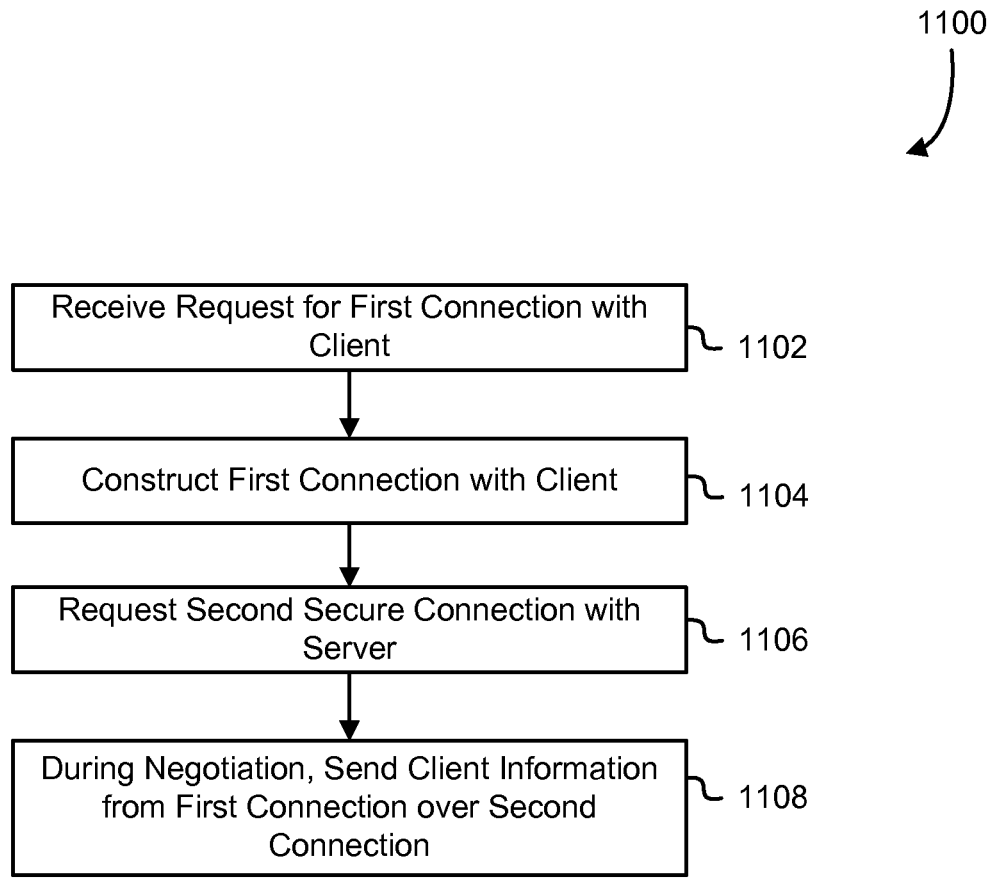
FIG. 11 shows an illustrative example of a process that may be used to share information through an endpoint in accordance with at least one embodiment.

Turning now to FIG. 11, an illustrative example of a process that may be used to share information through an endpoint in accordance with at least one embodiment is shown. A system such as the one seen in FIG. 9 may perform this process 1100, including a client 902, endpoint 904 and application 906. An endpoint may receive 1102 a request for a first connection with a client. The endpoint may construct 1104 the first connection with the client. The endpoint may request to construct 1106 a second secure connection with a server supported by the endpoint. During the negotiation of the second secure connection, the endpoint may send 1108 the client information from the first connection to the server using the secure protocol.

Figure 12:
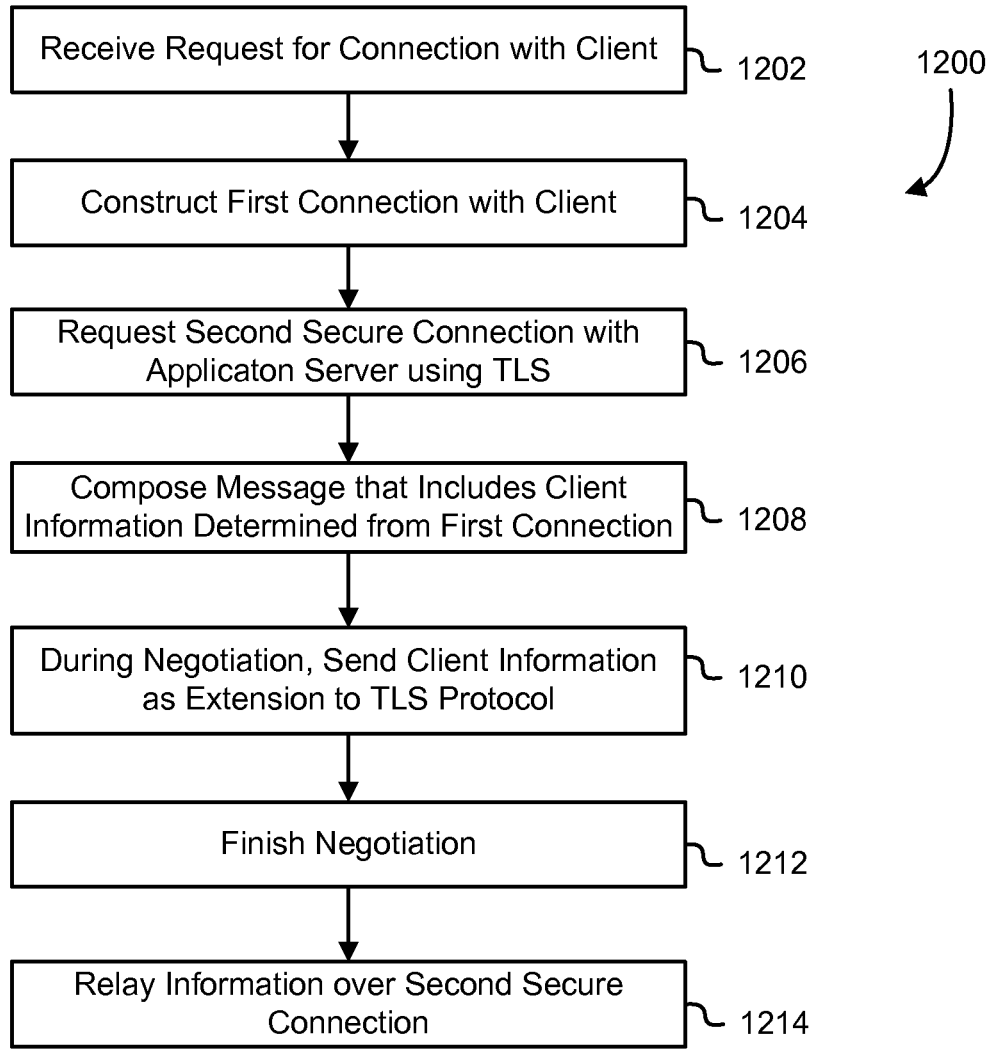
FIG. 12 shows an illustrative example of a process that may be used to share information through an endpoint in accordance with at least one embodiment.

For example, the second secure connection may be using TLS as seen in FIG. 12 using a process 1200 to share information. The endpoint may be a load balancer and the application may be a financial application. The load balancer may receive 1202 a request for a connection with a client, such as using TLS. The load balancer may construct 1204 the first connection with the client. In response to constructing the first connection, the load balancer may request 1206 a second secure connection using TLS with an application server. The load balancer may compose 1208 a TLS extension message that includes client information determined from the first connection. During negotiation of the TLS connection between the load balancer and the application server, the load balancer may use a TLS extension to send 1210 the TLS extension message. The load balancer and application server may then finish 1212 the negotiation. The load balancer may then relay 1214 information between the client and the application server over the secure connections.

Figure 13:
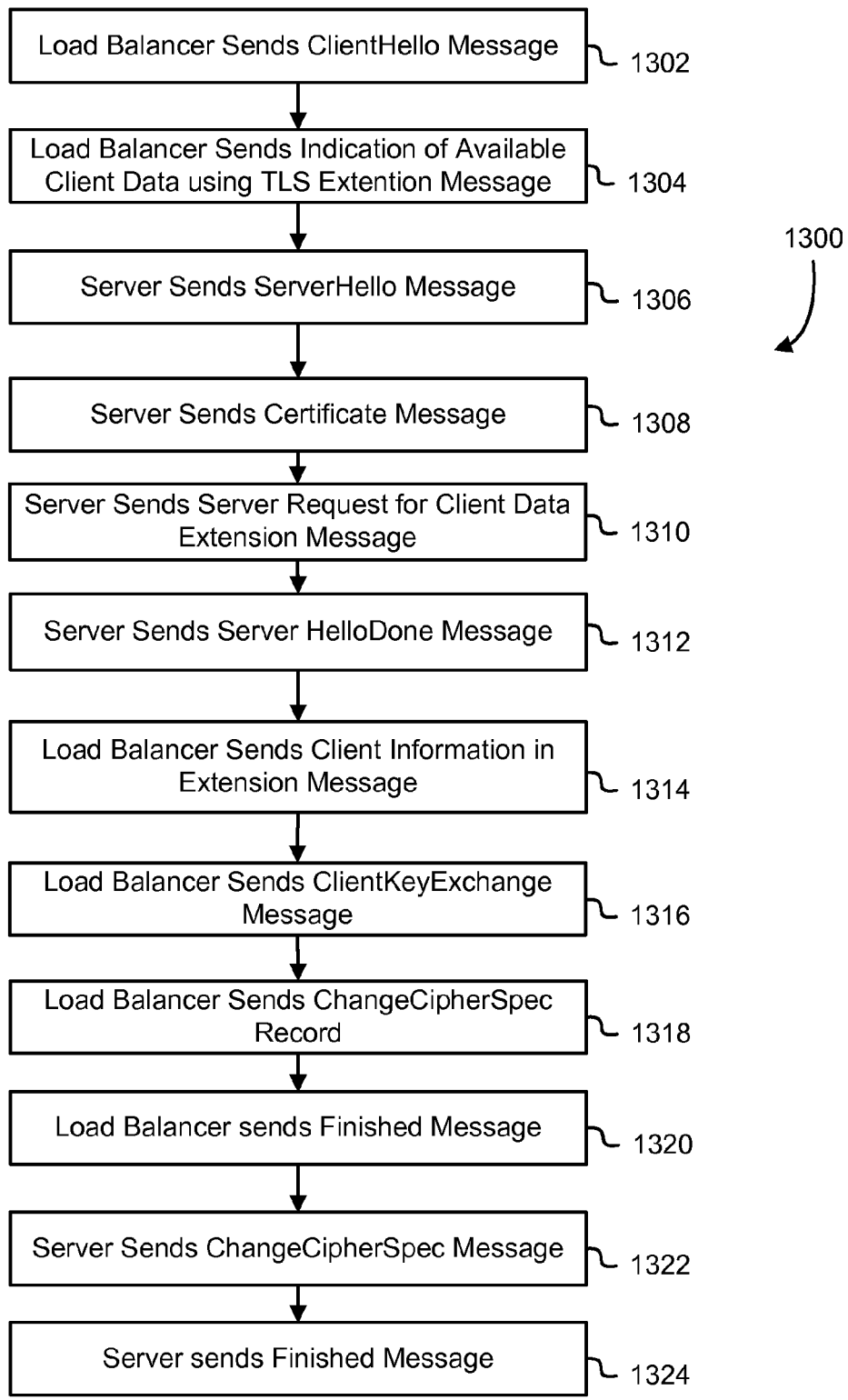
FIG. 13 shows an illustrative example of a process that may be used to share information through transport layer security in accordance with at least one embodiment.

Turning now to FIG. 13, an illustrative example of a process that may be used to share information through a transport layer security protocol in accordance with at least one embodiment is shown. A system such as one seen in FIG. 9 may perform this process 1300, including a client 902, endpoint 904 and application 906. Following the TLS protocol, a load balancer sends 1302 a ClientHello message and sends 1304 an indication of available client data using a TLS extension message. The ClientHello message may include a supported TLS protocol version, a random number, available CipherSuites and available compression methods. The application server sends 1306 a ServerHello message that may include a chosen protocol version, a random number, a selected CipherSuite and a selected compression method. The server then sends 1308 a certificate message. The server may also send 1310 a request for client data as an extension to TLS protocol. The server may then send 1312 a HelloDone message indicating that the server is done with a handshake portion of the TLS protocol. The load balancer may then send 1314 the client information in an extension message. The load balancer may then send 1316 a ClientKeyExchange message which may contain a value or nothing depending on the selected CipherSuite. The load balancer may then send a ChangeCipherSpec record indicating 1318 that future messages will be encrypted. The load balancer may then send a Finished message 1320 that is encrypted and/or authenticated. The server may then send 1322 a ChangeCipherSpec message that indicates that future messages will be encrypted. The server may then send a Finished message that is encrypted and/or authenticated, after which an application phase may begin in which messages from layers above the TLS layer may be passed, such as HTTP and/or application layer messages as seen in FIG. 10.

While transport layer security (TLS) has been used herein for descriptive purposes, it should be recognized that other extensible secure protocols may be used.

It should be recognized that a client may be a computing resource configured to interact with a second computing resource. For example, a client may be a web browser that accesses a web application using transport layer security.

Figure 14:
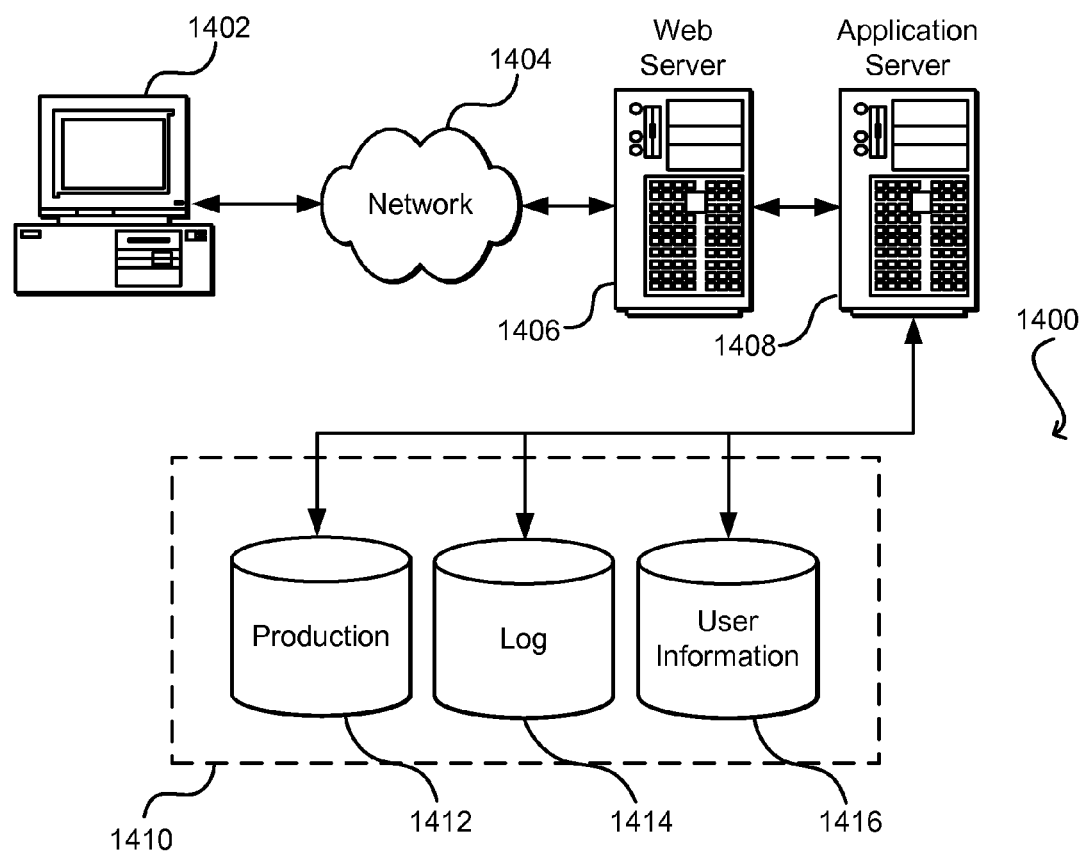
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for identifying a client, comprising:
   receive, by one or more computer systems, a first request for a first secure connection from a client device;
   negotiating, in response to receiving the first request, a set of connection parameters including an indication identifying the client device;
   composing, based at least in part on the negotiated set of connection parameters, a transport layer security (TLS) session identifier having a session information portion and a client information portion, the client information portion including the indication identifying the client device;
   sending the TLS session identifier to the client device as part of the negotiation of the first secure connection;
   receiving a request to resume secure communications and the session identifier from the client device;
   deconstructing the session identifier into the session information portion and the client information portion;
   constructing, based at least in part on the received request, a second secure connection between the client device and the one or more computer systems;
   creating, at a datastore of the one or more computer systems, an association between the first secure connection and the second secure connection based at least in part on the client information portion; and
   creating an association between at least one first action performed over the first secure connection and at least one second action performed over the second secure connection.

2. The computer-implemented method of claim 1,
   wherein the at least one first action is an advertising management function;
   wherein the at least one second action is an advertising click; and
   the method further comprising determining that the at least one second action is related to click fraud.

3. The computer-implemented method of claim 1,
   wherein the at least one first action is a first content submission under a first account;
   wherein the at least one second action is a second content submission under a second account; and
   the method further comprising detecting that the association between the first account and second account that indicates circumvention of content submission restrictions.

4. The computer-implemented method of claim 1, wherein composing the TLS session identifier further comprises:
   sending the TLS session information to an application; and
   receiving the TLS session identifier from the application.

5. The computer-implemented method of claim 1, wherein the TLS session identifier is a TLS session ticket.

6. The computer-implemented method of claim 1, wherein the TLS session identifier is a TLS session ID.

7. The computer-implemented method of claim 6, wherein composing the TLS session identifier further comprises appending a client identifier value to a session value.

8. The computer-implemented method of claim 1, further comprising:
   receiving a first set of credentials over the first secure connection;
   receiving a second set of credentials over the second secure connection; and
   associating the first set of credentials with the second set of credentials.

9. The computer-implemented method of claim 1, wherein the indication identifying the client device includes at least one of an account reference or visitor reference.

10. A computer-implemented method for identifying a client, comprising:
    receive, at a connection endpoint server of one or more computer systems, a request for a first secure connection from a client device, the request including at least one indication of the client device;
    sending a session identifier to the client device as part of the negotiation of the first secure connection, the session identifier containing the at least one indication of the client device;
    receiving, at the connection endpoint server, a second request for a second secure connection and the session identifier from the client device;
    determining that the client device requesting the second secure connection is the client device that requested the first secure connection based at least in part on the at least one indication of the client device contained in the session identifier;
    updating a datastore to reflect a relationship between the client device and the second secure connection; and
    creating, based at least in part on the relationship between the client device and the second secure connection, an association between an action performed with regard to the second secure connection with the client device of the first secure connection.

11. The computer-implemented method of claim 10, wherein the first secure connection and the second secure connection use a transport layer security protocol.

12. The computer-implemented method of claim 10, further comprising:
    sending session information from the first secure connection to an application;
    receiving the session identifier from the application; and
    sending the session identifier to the application in response to receiving the session identifier as part of the second secure connection.

13. The computer-implemented method of claim 10, further comprising:
    determining that the session identifier has expired based at least in part on an elapsed time between the first secure connection and the second secure connection; and
    sending a second session identifier based at least in part on client identification information in the expired session identifier to the client device.

14. The computer-implemented method of claim 10, further comprising:
    determining that an account is associated with the client device during the first secure connection; and
    associating the account with one or more actions performed over the second secure connection.

15. The computer-implemented method of claim 10, wherein the session identifier is a session ticket of the transport layer security (TLS) protocol.

16. A computer system for identifying a client, comprising:
    a connection endpoint server having one or more processors and memory including executable instructions that, when executed by the one or more processors, cause the one or more processors to implement at least:
        a client-facing endpoint that terminates a first secure connection and a second secure connection between a client device and the client-facing endpoint;
        a session identifier used to identify the client device, sent to the client device from the client facing endpoint during setup of the first secure connection and received by the client-facing endpoint as part of the setup of the second secure connection, the session identifier including at least one negotiated parameter and at least one indication of the client device;
        a datastore updated to reflect an association between the identity of the client device and the second secure connection, the identity of the client being determined based at least in part on the session identifier received by the client-facing endpoint during the second secure connection; and
        a computing device executing an application that causes the computing device to associate at least one operation with the identity of the client.

17. The computer system of claim 16, wherein the client-facing endpoint determines whether a same client device is present during the first secure connection and the second secure connection.

18. The computer system of claim 16, wherein the application determines whether a same client device is present during the first secure connection and the second secure connection.

19. The computer system of claim 16, wherein the session identifier further comprises session information and client information.

20. The computer system of claim 16, wherein the client facing-endpoint is one of a set of client facing endpoints operable to terminate the first secure connection or the second secure connection on behalf of the application.

21. The computer system of claim 16, wherein the application further comprises a set of application servers, each application server operable to service one or more client devices.

22. One or more non-transitory computer-readable storage media having collectively stored thereon executable instructions that, when executed by one or more processors of a computer system, cause the computer system to at least:
    receiving, at a connection endpoint server of one or more computer systems, session information from an endpoint of a first secure connection with a client device;
    composing a session identifier based at least in part on session information and information related to the client device;
    providing the session identifier to the endpoint for use in a second secure connection with the client device;
    receiving the session identifier from the client device in a request for the second secure connection;
    updating a datastore to reflect a relationship between the client device and the second secure connection; and
    creating, based at least in part on the relationship between the client device and the second secure connection, an association between an action executed over the second secure connection with the client device based at least in part on the session identifier.

23. The non-transitory computer-readable storage media of claim 22, wherein composing the session identifier further comprising storing client information in the session identifier.

24. The non-transitory computer-readable storage media of claim 22, wherein the session identifier is a session ID of a transport layer security protocol and wherein the session identifier comprises session information and a client identifier.

25. The non-transitory computer-readable storage media of claim 22, wherein the session identifier is a session ticket of a transport layer security protocol and wherein the session identifier comprises session information and a client identifier.

26. The non-transitory computer-readable storage media of claim 22, wherein the instructions further comprise instructions that, when executed, cause the computer system to at least:
    monitor at least one action performed by the client device over the second secure connection;
    receive account information from the client device sent over the second secure connection; and
    associate the at least one action performed over the second secure connection with an account associated with a user of the client device.

27. The non-transitory computer-readable storage media of claim 22, wherein associating the action executed over the second secure connection with the client device further comprises determining an identity of the client device based at least in part on the combination of the session identifier and one or more secondary identifiers.

* * * * *